United States Patent
Chan et al.

(10) Patent No.: US 10,068,176 B2
(45) Date of Patent: Sep. 4, 2018

(54) DEFECT PREDICTION METHOD AND APPARATUS

(71) Applicant: Huawei Technologies Co., Ltd., Shenzhen, Guangdong (CN)

(72) Inventors: Wun Wah Edmond Chan, Shenzhen (CN); Lujia Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 791 days.

(21) Appl. No.: 14/587,724

(22) Filed: Dec. 31, 2014

(65) Prior Publication Data

US 2015/0112903 A1  Apr. 23, 2015

Related U.S. Application Data

(63) Continuation of application No. PCT/CN2013/080279, filed on Jul. 29, 2013.

(30) Foreign Application Priority Data

Feb. 28, 2013  (CN) .......................... 2013-1-0066324

(51) Int. Cl.
*G06F 15/18* (2006.01)
*G06N 5/04* (2006.01)
(Continued)

(52) U.S. Cl.
CPC ......... *G06N 5/04* (2013.01); *G06F 17/30961* (2013.01); *G06N 99/005* (2013.01)

(58) Field of Classification Search
CPC .................................................... G06F 11/008
(Continued)

(56) References Cited

U.S. PATENT DOCUMENTS 5,991,699 A    11/1999  Kulkarni et al.
6,148,099 A *  11/2000  Lee ...................... G06T 7/0006
                                                      382/145
(Continued)

FOREIGN PATENT DOCUMENTS

CN    101799320 A    8/2010
CN    101556553 B    4/2011
(Continued)

OTHER PUBLICATIONS

Murthy, Automatic Construction of Decision Trees from Data: A Multi-Disciplinary Survey, 1998, Data Mining, and Knowlege Discovery, pp. 1-45.*

(Continued)

*Primary Examiner* — David R Vincent (57) ABSTRACT

Embodiments of the present invention disclose a defect prediction method and apparatus, which relate to the data processing field, and implement accurate and quick locating of a defect in a faulty product. A specific solution is as follows: selecting a training attribute set from a pre-stored product fault record according to a target attribute, and combining the target attribute and the training attribute set into a training set, where the target attribute is a defect attribute of a historical faulty product; generating a classifier set according to the training set, where the classifier set includes at least two tree classifiers; and predicting a defect of a faulty product by using the classifier set as a prediction model. The present invention is used in a process of predicting a defect of a faulty product.

16 Claims, 4 Drawing Sheets

(51) Int. Cl.
*G06N 99/00* (2010.01)
*G06F 17/30* (2006.01)

(58) Field of Classification Search
USPC .................................................... 706/12, 45
See application file for complete search history.

(56) References Cited

U.S. PATENT DOCUMENTS

| | | | |
|---|---|---|---|
| 6,477,471 B1 | 11/2002 | Hedstrom et al. | |
| 6,513,025 B1 * | 1/2003 | Rosen .................... | G06N 5/025 |
| | | | 706/12 |
| 7,536,677 B2 | 5/2009 | Carlos | |
| 7,767,395 B2 | 8/2010 | Garrett et al. | |
| 8,140,514 B2 | 3/2012 | Nguyen et al. | |
| 8,165,826 B2 | 4/2012 | Schimert et al. | |
| 2006/0112039 A1 | 5/2006 | Wang | |
| 2006/0212293 A1 | 9/2006 | Tur | |
| 2007/0074149 A1 | 3/2007 | Ognev et al. | |
| 2007/0124235 A1 | 5/2007 | Chakraborty et al. | |
| 2007/0150084 A1 | 6/2007 | Grubb et al. | |
| 2007/0208516 A1 | 9/2007 | Kutsyy et al. | |
| 2007/0260563 A1 | 11/2007 | Fan et al. | |
| 2008/0168011 A1 | 7/2008 | Steinberg | |
| 2009/0062114 A1 | 3/2009 | Arakawa et al. | |
| 2009/0281981 A1 | 11/2009 | Chen et al. | |
| 2010/0292331 A1 | 11/2010 | Mitchell et al. | |
| 2011/0172874 A1 * | 7/2011 | Patnaik ................. | G06F 11/008 |
| | | | 701/31.4 |
| 2011/0268345 A1 * | 11/2011 | Nakagaki ............. | G06K 9/6256 |
| | | | 382/149 |
| 2011/0302111 A1 | 12/2011 | Chidlovskii | |

FOREIGN PATENT DOCUMENTS

| | | |
|---|---|---|
| CN | 102622510 A | 8/2012 |
| CN | 102928720 A | 2/2013 |
| EP | 1 575 210 A1 | 9/2005 |

OTHER PUBLICATIONS

Yi Peng et al., "User preferences based software defect detection algorithms selection using MCDM", Information Sciences, vol. 191, Apr. 24, 2010, p. 3-13.

V. Sugumaran et al., "Feature selection using Decision Tree and classification through Proximal Support Vector Machine for fault diagnostics of roller bearing", Mechanical Systems and Signal Processing, vol. 21, No. 2, Nov. 6, 2006, p. 930-942.

Xuedong Yan et al., "Analyses of Rear-End Crashes Based on Classification Tree Models", Traffic Injury Prevention, vol. 7, No. 3, Sep. 1, 2006, p. 276-282.

Luo Aiminl et al., "Method of multi-classification by improved binary tree based on SVM for welding defects recongnition", Transactions of the China Welding Institution, vol. 31, No. 7, Jul. 2010, 11 pages.

* cited by examiner

DEFECT PREDICTION METHOD AND APPARATUS

CROSS-REFERENCE TO RELATED APPLICATIONS

This application is a continuation of International Application No. PCT/CN2013/080279, filed on Jul. 29, 2013, which claims priority to Chinese Patent Application No. 201310066324.0, filed on Feb. 28, 2013, both of which are hereby incorporated by reference in their entireties.

TECHNICAL FIELD

The present invention relates to the data processing field, and in particular, to a defect prediction method and apparatus.

BACKGROUND

With times development, types and quantities of products that can meet people's needs are gradually increasing, and product quality also becomes a major concern for users and enterprises. Especially for the enterprises, the product quality is fundamental to the enterprises. Therefore, lowering a defect rate of the products is of vital importance for the enterprises. A cause of a product defect is mainly a production technique of a product, including design of the product, quality of a used material, a manufacturer capability, and the like. Therefore, for the enterprises, if the defect rate of the products needs to be lowered, the production technique of the product needs to be analyzed and improved, so as to improve the product quality.

For each product, there is a record of information about the product in various aspects, such as a source of a raw material, production information, test information, transportation information, and usage information. When a defect or a fault of a type occurs in a product in a production or use process, a factor that causes this type of a defect or a fault is somehow correlated with the recorded information about the product.

In the prior art, a method for predicting a defect of a faulty product is provided and is specifically as follows: a single decision tree is generated by using recorded information about a product in which a fault has occurred and by using a decision tree-based classification algorithm; and in this way, when a fault occurs in the product, a defect of the faulty product can be predicted according to the generated decision tree. However, when there are multiple classification labels of the recorded information about the product in which a fault has occurred, the single decision tree generated by using the decision tree-based classification algorithm may easily cause overfitting or underfitting, and therefore the defect prediction cannot be performed. Therefore, when a defect or a fault occurs in a product, how to quickly locate a fault point and find a fault cause has become a focus in industry research.

SUMMARY

Embodiments of the present invention provide a defect prediction method and apparatus, so as to implement accurate and quick locating of a defect in a faulty product.

According to a first aspect of the present invention, a defect prediction method is provided and includes:

selecting a training attribute set from a pre-stored product fault record according to a target attribute, and combining the target attribute and the training attribute set into a training set, where the target attribute is a defect attribute of a historical faulty product;

generating a classifier set according to the training set, where the classifier set includes at least two tree classifiers; and predicting a defect of a faulty product by using the classifier set as a prediction model.

With reference to the first aspect, in a possible implementation manner, the training set includes M training units, and each training unit includes one target attribute and one training attribute set; and the generating a classifier set according to the training set includes:

selecting a first training subset from the training set;

generating, according to a preset policy, a first tree classifier corresponding to the first training subset;

selecting a second training subset from the training set;

generating, according to the preset policy, a second tree classifier corresponding to the second training subset;

selecting an $N^{th}$ training subset from the training set, where the $N^{th}$ training subset includes M' training units, and M' is less than or equal to M;

generating, according to the preset policy, an $N^{th}$ tree classifier corresponding to the $N^{th}$ training subset, where N is an integer greater than or equal to 2; and combining N tree classifiers to generate the classifier set.

With reference to the first aspect and the foregoing possible implementation manner, in another possible implementation manner, the method further includes:

acquiring an error rate of generated K−1 tree classifiers when a $(K-1)^{th}$ tree classifier is generated; and acquiring an error rate of generated K tree classifiers when a $K^{th}$ tree classifier is generated, so that when a difference between the error rate of the K tree classifiers and the error rate of the K−1 tree classifiers is less than a preset threshold, the K tree classifiers are combined to generate the classifier set, where K is an integer less than or equal to N.

With reference to the first aspect and the foregoing possible implementation manner, in another possible implementation manner, the acquiring an error rate of generated K tree classifiers when a $K^{th}$ tree classifier is generated includes:

selecting a first type tree classifier from the classifier set according to a first training unit;

generating a first prediction label of the first training unit according to the first type tree classifier;

selecting a second type tree classifier from the classifier set according to a second training unit;

generating a second prediction label of the second training unit according to the second type tree classifier;

selecting an $M^{th}$ type tree classifier from the classifier set according to an $M^{th}$ training unit, where the $M^{th}$ type tree classifier is a classifier set that does not use the $M^{th}$ training unit to generate a tree classifier, and M is the number of training units included in the training set;

generating an $M^{th}$ prediction label of the $M^{th}$ training unit according to the $M^{th}$ type tree classifier; and acquiring the error rate of the generated K tree classifiers according to M prediction labels.

With reference to the first aspect and the foregoing possible implementation manner, in another possible implementation manner, the generating an $M^{th}$ prediction label of the $M^{th}$ training unit according to the $M^{th}$ type tree classifier specifically includes:

generating the M$^{th}$ prediction label according to $$C^{OOB}(M, x_M) = \underset{y}{\mathrm{argmax}} \sum_{C_j \in C_M^{OOB}} h(\varepsilon_j) I(C_j(x_M) = y),$$

where $C^{OOB}(M, x_M)$ is the M$^{th}$ prediction label of the M$^{th}$ training unit, $C_j$ is a j$^{th}$ tree classifier, $C_M^{OOB}$ is the M$^{th}$ type tree classifier, $h(\varepsilon_j)$ is a weight of the j$^{th}$ tree classifier, $C_j(x_M)$ is a target attribute that is obtained according to the j$^{th}$ tree classifier and a training attribute set included in the M$^{th}$ training unit, y∈Y, and Y is a classification label set.

With reference to the first aspect and the foregoing possible implementation manner, in another possible implementation manner, the acquiring the error rate of the generated K tree classifiers according to M prediction labels specifically includes:

acquiring the error rate of the generated K tree classifiers according to $$E(T) = \frac{1}{M} \sum_{r=1}^{M} I(C^{OOB}(r, x_r) = y_r),$$

where E(T) is the error rate of the generated K tree classifiers, M is the number of training units in the training set, $C^{OOB}(r, x_r)$ is an r$^{th}$ prediction label of an r$^{th}$ training unit, and $y_r$ is a target attribute of the r$^{th}$ training unit.

With reference to the first aspect and the foregoing possible implementation manner, in another possible implementation manner, after the generating, according to the preset policy, an N$^{th}$ tree classifier corresponding to the N$^{th}$ training subset, the method further includes:

selecting an N'$^{th}$ training subset from the training set, where an intersection set of the N'$^{th}$ training subset and the N$^{th}$ training subset is empty, and the N'$^{th}$ training subset includes at least one training unit;

acquiring a false prediction rate of the N$^{th}$ tree classifier according to the N'$^{th}$ training subset; and acquiring a weight of the N$^{th}$ tree classifier according to the false prediction rate of the N$^{th}$ tree classifier.

With reference to the first aspect and the foregoing possible implementation manner, in another possible implementation manner, the predicting a defect of a faulty product by using the classifier set as a prediction model includes:

collecting statistics about attribute information of the faulty product;

predicting the defect of the faulty product by using the classifier set as a prediction model and according to the attribute information, so as to obtain a classification label set; and acquiring a trust value of each classification label in the classification label set according to the classifier set and a weight of each tree classifier in the classifier set.

With reference to the first aspect and the foregoing possible implementation manner, in another possible implementation manner, the preset policy includes a decision tree algorithm.

According to a second aspect of the present invention, a defect prediction apparatus is provided and includes:

a processing unit, configured to select a training attribute set from a pre-stored product fault record according to a target attribute, and combine the target attribute and the training attribute set into a training set, where the target attribute is a defect attribute of a historical faulty product;

a generating unit, configured to generate a classifier set according to the training set that is obtained by the processing unit, where the classifier set includes at least two tree classifiers; and a predicting unit, configured to predict a defect of a faulty product by using the classifier set, which is generated by the generating unit, as a prediction model.

With reference to the second aspect, in a possible implementation manner, the training set includes M training units, and each training unit includes one target attribute and one training attribute set; and the generating unit includes:

a selecting module, configured to select a first training subset from the training set that is obtained by the processing unit; and a generating module, configured to generate, according to a preset policy, a first tree classifier corresponding to the first training subset that is selected by the selecting module, where:

the selecting module is further configured to select a second training subset from the training set that is obtained by the processing unit;

the generating module is further configured to generate, according to the preset policy, a second tree classifier corresponding to the second training subset that is selected by the selecting module;

the selecting module is further configured to select an N$^{th}$ training subset from the training set that is obtained by the processing unit, where the N$^{th}$ training subset includes M' training units, and M' is less than or equal to M; and the generating module is further configured to generate, according to the preset policy, an N$^{th}$ tree classifier corresponding to the N$^{th}$ training subset that is selected by the selecting module, where N is an integer greater than or equal to 2; and a combining module, configured to combine N tree classifiers generated by the generating module to generate the classifier set.

With reference to the second aspect and the foregoing possible implementation manner, in another possible implementation manner, the generating unit further includes:

a first acquiring module, configured to acquire an error rate of generated K−1 tree classifiers when a (K−1)$^{th}$ tree classifier is generated; and a second acquiring module, configured to acquire an error rate of generated K tree classifiers when a K$^{th}$ tree classifier is generated, so that when a difference between the error rate of the K tree classifiers and the error rate of the K−1 tree classifiers is less than a preset threshold, the K tree classifiers are combined to generate the classifier set, where K is an integer less than or equal to N.

With reference to the second aspect and the foregoing possible implementation manner, in another possible implementation manner, the second acquiring module includes:

a selecting submodule, configured to select a first type tree classifier from the classifier set according to a first training unit;

a generating submodule, configured to generate a first prediction label of the first training unit according to the first type tree classifier that is selected by the selecting submodule, where:

the selecting submodule is further configured to select a second type tree classifier from the classifier set according to a second training unit;

the generating submodule is further configured to generate a second prediction label of the second training unit according to the second type tree classifier that is selected by the selecting submodule;

the selecting submodule is further configured to select an $M^{th}$ type tree classifier from the classifier set according to an $M^{th}$ training unit, where the $M^{th}$ type tree classifier is a classifier set that does not use the $M^{th}$ training unit to generate a tree classifier, and M is the number of training units included in the training set; and the generating submodule is further configured to generate an $M^{th}$ prediction label of the $M^{th}$ training unit according to the $M^{th}$ type tree classifier that is selected by the selecting submodule; and an acquiring submodule, configured to acquire the error rate of the generated K tree classifiers according to M prediction labels that are generated by the generating submodule.

With reference to the second aspect and the foregoing possible implementation manner, in another possible implementation manner, the generating submodule is specifically configured to:

generate the $M^{th}$ prediction label according to $$C^{OOB}(M, x_M) = \underset{y}{\mathrm{argmax}} \sum_{C_j \in C_M^{OOB}} h(\varepsilon_j) I(C_j(x_M) = y),$$

where $C^{OOB}(M, x_M)$ is the $M^{th}$ prediction label of the $M^{th}$ training unit, $C_j$ is a $j^{th}$ tree classifier, $C_M^{OOB}$ is the $M^{th}$ type tree classifier, $h(\varepsilon_j)$ is a weight of the $j^{th}$ tree classifier, $C_j(x_M)$ is a target attribute that is obtained according to the $j^{th}$ tree classifier and a training attribute set included in the $M^{th}$ training unit, $y \in Y$, and Y is a classification label set.

With reference to the second aspect and the foregoing possible implementation manner, in another possible implementation manner, the acquiring submodule is specifically configured to:

acquire, according to $$E(T) = \frac{1}{M} \sum_{r=1}^{M} I(C^{OOB}(r, x_r) = y_r),$$

the error rate of the K tree classifiers generated by the generating submodule, where E(T) is the error rate of the generated K tree classifiers, M is the number of training units in the training set, $C^{OOB}(r, x_r)$ is an $r^{th}$ prediction label of an $r^{th}$ training unit, and $y_r$ is a target attribute of the $r^{th}$ training unit.

With reference to the second aspect and the foregoing possible implementation manner, in another possible implementation manner, the method further includes:

a selecting unit, configured to select an $N'^{th}$ training subset from the training set after the generating module generates, according to the preset policy, an $N^{th}$ tree classifier corresponding to the $N^{th}$ training subset, where an intersection set of the $N'^{th}$ training subset and the $N^{th}$ training subset is empty, and the $N'^{th}$ training subset includes at least one training unit;

a first acquiring unit, configured to acquire a false prediction rate of the $N^{th}$ tree classifier according to the $N'^{th}$ training subset that is selected by the selecting unit; and a first acquiring unit, configured to acquire a weight of the $N^{th}$ tree classifier according to the false prediction rate of the $N^{th}$ tree classifier that is acquired by the first acquiring unit.

With reference to the second aspect and the foregoing possible implementation manner, in another possible implementation manner, the predicting unit includes:

a statistics collecting module, configured to collect statistics about attribute information of the faulty product;

a predicting module, configured to predict the defect of the faulty product by using the classifier set as a prediction model and according to the attribute information about which the statistics collecting module collects statistics, so as to obtain a classification label set; and a third acquiring module, configured to acquire a trust value of each classification label in the classification label set according to the classifier set and a weight of each tree classifier in the classifier set.

With reference to the second aspect and the foregoing possible implementation manners, in another possible implementation manner, the preset policy includes a decision tree algorithm.

In a defect prediction method and apparatus provided in the embodiments of the present invention, a training attribute set is selected from a pre-stored product fault record according to a target attribute, and a classifier set that includes at least two tree classifiers is generated according to a training set that is obtained by combining the target attribute and the training attribute set. In this case, when a fault occurs in a product, the classifier set may be used as a prediction model to predict a defect of the faulty product. By using the classifier set as a prediction model, a problem that a defect of a faulty product cannot be predicted due to overfitting or underfitting that is easily caused by using of a single decision tree is solved, and accuracy for predicting the defect of the faulty product is also improved in addition to quick location of the defect of the faulty product.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
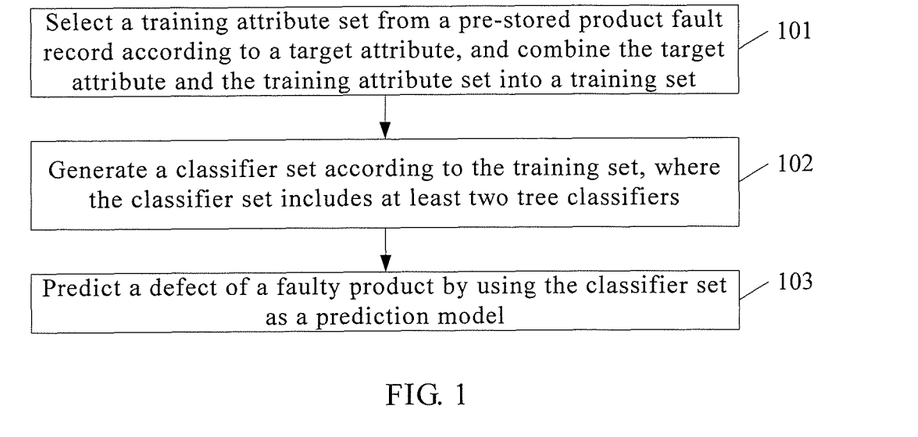
FIG. 1 is a flowchart of a defect prediction method according to Embodiment 1 of the present invention.

This embodiment of the present invention provides a defect prediction method. As shown in FIG. 1, the method may include:

101. Select a training attribute set from a pre-stored product fault record according to a target attribute, and combine the target attribute and the training attribute set into a training set.

When a fault occurs in a product, a fault detection person generally expects to quickly locate a defect type of the faulty product or a component that causes the fault in the product, so as to save maintenance time for a maintenance person. However, to implement quick locating of the defect type of the faulty product or the component that causes the fault in the product, a prediction model may be trained in advance. First, the fault detection person may collect information about a product in which a fault has occurred in a production phase or a use process and record the information in a product fault record. In this way, when a prediction model is trained, an attribute required for establishing a prediction model may be selected as a training attribute set, where the attribute is selected, according to a defect attribute of a historical faulty product, from the product fault record, which is recorded in advance, of the product in which a fault has occurred, and the defect attribute of the historical faulty product is defined as a target attribute. After the training attribute set is selected according to the target attribute, the target attribute and the training attribute set are combined to generate a training set. Specifically, the training set may include multiple training units, and each training unit includes one target attribute and one training attribute set.

102. Generate a classifier set according to the training set, where the classifier set includes at least two tree classifiers.

After the required training attribute set is selected according to the target attribute, and the target attribute and the training attribute set are combined into the training set, the classifier set can be generated according to the training set. Specifically, the classifier set includes at least two tree classifiers, each tree classifier is generated according to a preset policy, and all generated tree classifiers are combined together into the classifier set. The preset policy may be a decision tree algorithm, or the like.

103. Predict a defect of a faulty product by using the classifier set as a prediction model.

In the production or use process, if a fault occurs in a product, a defect of the faulty product can be quickly and accurately located according to the generated classifier set that includes at least one tree classifier.

In a defect prediction method provided in this embodiment of the present invention, a training attribute set is selected from a pre-stored product fault record according to a target attribute, and a classifier set that includes at least two tree classifiers is generated according to a training set that is obtained by combining the target attribute and the training attribute set. In this case, when a fault occurs in a product, the classifier set may be used as a prediction model to predict a defect of the faulty product. By using the classifier set as a prediction model, a problem that a defect of a faulty product cannot be predicted due to overfitting or underfitting that is easily caused by using of a single decision tree is solved, and accuracy for predicting the defect of the faulty product is also improved in addition to quick location of the defect of the faulty product.

Embodiment 2

Figure 2:
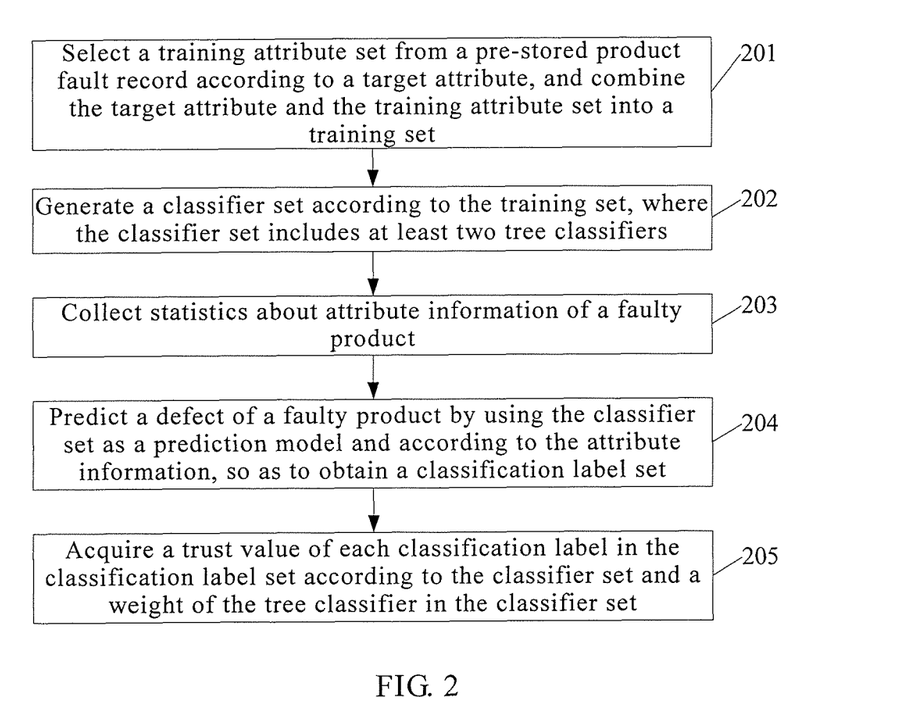
FIG. 2 is a flowchart of a defect prediction method according to Embodiment 2 of the present invention.

This embodiment of the present invention provides a defect prediction method. As shown in FIG. 2, the method may include:

201. Select a training attribute set from a pre-stored product fault record according to a target attribute, and combine the target attribute and the training attribute set into a training set.

Specifically, when a fault occurs in a product in a production process or a use process, a fault detection person generally expects to quickly locate a defect type of the faulty product or a component in which the fault occurs; however, for any product, occurrence of a fault or a defect is somehow correlated with objective information about the product, such as a model of the product, a use environment, and a source of a raw material. When a fault or a defect occurs in a product, to implement quick locating of a defect type of the faulty product or a component in which the fault occurs, an attribute required for establishing a prediction model may be selected from a product faulty record of a product in which a fault has occurred in the production phase or the use process, and the selected attribute is combined into a training set, and the training set is used to establish a prediction model.

A first thing to do is to collect attribute information of a product in which a fault has occurred in a production phase or a use process, and record the attribute information of each faulty product. The attribute information may be specifically classified into the following types: an attribute describing a product feature, an attribute describing a use environment, an attribute describing a production phase, and a defect attribute. The attribute describing a product feature may be a product name, a product model, a component part, and the like; the attribute describing a use environment may be a life cycle, a use place, a use climate, and the like; the attribute describing a production phase may be a production date, a processing department, a detection record, and the like; and the defect attribute may be a defect type, a defect phenomenon, a root cause of a defect, a defective component, and the like.

It should be noted that classification of the recorded attribute information of the faulty product and types of the attribute information recorded for each classification are not limited in this embodiment of the present invention, and a form of recording the attribute information of the faulty product is not limited either.

For the faulty product, a large amount of attribute information is recorded and some attributes are not attributes that must be used to establish a prediction model, that is, some attributes do little to determine a defect of the faulty product. Therefore, a next thing to do is to filter the attribute information of the faulty product. It may be understood that the defect attribute in the attribute information that is of the faulty product and recorded in the historical fault record may probably be a fault of a product in which a fault will occur, that is, an attribute that needs to be predicted in the product in which a fault will occur. Therefore, to assist a person skilled in the art in understanding, a defect attribute of the historical faulty product is called a target attribute, and an attribute that is selected from the defect attribute of the historical faulty product and is strongly correlated with the defect attribute is called a training attribute set. The target attribute and the training attribute set may be combined into a training set, so that the training set can be used to establish a prediction model. A filtering process may be specifically as follows: for the target attribute, filtering is performed on the recorded attribute information, and X attributes may be selected to form a training attribute set, where X may be all attributes in the recorded attribute information or may be one attribute. For example, the defect attribute of the historical faulty product is a defect type, a target attribute Y={Defect type} may be defined. The recorded attribute information of the faulty product includes: a product name, a product model, a component part, a life cycle, a use place, a use climate, a production date, a processing department, a detection record, a defect type, a defect phenomenon, a root cause of a defect, and a defective component, and a preset rule may be used to select an attribute required for establishing a prediction model from the attribute information in the recorded historical fault record of the faulty product, so as to form a training attribute set. It is assumed that the attributes that are selected are: a product name, a production date, a processing department, and a life cycle, that is, a training attribute set X={Product name, production date, processing department, life cycle} may be defined. In this case, a training set T={Product name, production date, processing department, life cycle, defect type} may be defined. After the target attribute and the training attribute set are selected, multiple attributes corresponding to the faulty product may be selected from the historical fault record according to the target attribute and the training attribute set to generate a training set, where the training attribute set includes M training units, and each training unit includes one target attribute and one training attribute set of the historical faulty product. There are two requirements for selecting an attribute from a training attribute set: the first one is that high accuracy is required for a prediction model that is established by using the training attribute set and predicts a target attribute, where this requirement may be implemented as follows: different training attribute sets are repeatedly selected for the target attribute to form a training set, and accuracy of prediction models established by using different generated training sets is verified, the one with the highest accuracy is selected as the training set required for establishing a prediction model, a target attribute of a faulty product with a known defect is removed, and attribute information of the faulty product in a production and manufacturing process is used as test data to detect accuracy of a generated tree classifier; and the second one is that an attribute in the training attribute set is obtainable before the faulty product is detected, for example, a defective component in the foregoing recorded attribute information of the faulty product cannot be used as an attribute in the training attribute set because a component, in which a fault occurs, in the faulty product cannot be learned before fault detection.

It should be noted that a specific rule for selecting a training attribute set may be a traversal method, or may be that former X attributes with a maximum correlation are selected, by calculating a correlation with the target attribute, as a training attribute set. A method for selecting and calculating a correlation with the target attribute is a commonly used method, and there are also many algorithms for calculating a correlation. A simplest method for calculating a correlation is to calculate frequency at which each attribute and the target attribute appear concurrently, and higher frequency for concurrent appearance indicates a stronger correlation. In this embodiment of the present invention, a method for selecting a training attribute set and an algorithm required for selecting some methods are not limited.

202. Generate a classifier set according to the training set, where the classifier set includes at least two tree classifiers.

After the training attribute set is selected from the pre-stored product fault record according to the target attribute and is combined into the training set, the classifier set may be generated according to the training set. It may be understood that the training set formed by the target attribute and the training attribute set may include M training units, and each training unit includes one target attribute and one training attribute set, that is, a training set $T=\{(X_r,Y_r), r=1, 2, \ldots M\}$, where $(X_1,Y_1)$ is the first training unit.

Specifically, a classifier set $C=\{C_j, j=1, 2, \ldots N\}$ may be generated according to the training set $T=\{(X_r,Y_r), r=1, 2, \ldots M\}$ in the following steps: 202a, 202b, and 202c.

202a. Select an $N^{th}$ training subset from the training set, where N is an integer greater than or equal to 2.

The $N^{th}$ training subset is selected from the training set $T=\{(X_r,Y_r), r=1, 2, \ldots M\}$, where the $N^{th}$ training subset includes M' training units, and M' is less than or equal to M. A selection method may be random sampling that the sample can be placed back, which is not limited in this embodiment of the present invention. For example, a first training subset, a second training subset, . . . , and the $N^{th}$ training subset may be selected from the training set.

202b. Generate, according to a preset policy, an $N^{th}$ tree classifier corresponding to the $N^{th}$ training subset.

After the $N^{th}$ training subset is selected from the training set, the $N^{th}$ tree classifier corresponding to the $N^{th}$ training subset may be generated according to the preset policy. The preset policy may be a spanning tree algorithm and may be specifically understood as follows: the $N^{th}$ training subset selected from the training set is used as a root node, a partition attribute and a partition predicate are selected according to a partition algorithm, and the root node is partitioned according to the partition attribute and the partition predicate to obtain two branches; an attribute in each branch may be selected by using an attribute selection policy, and then the branch continues to be partitioned according to the partition algorithm; and the foregoing steps are repeated until a finally generated branch obtained can determine a target attribute, and finally the generated tree classifier is detected according to a tree pruning policy. For example, the training set T={Product name, production date, processing department, life cycle, defect type} includes M training units, and the $N^{th}$ training subset is a set that includes M' training units and uses the $N^{th}$ training subset as a root node. It is assumed that, according to the partition algorithm, it is selected that: the partition attribute is a life cycle and the partition predicate is that the life cycle is more than 50 days and the life cycle is less than or equal to 50 days. In this way, the root node may be partitioned into two branches according to the partition attribute and the partition predicate, and the partition attribute and the partition predicate may further continue to be selected for partitioning until the target attribute can be determined.

The partition algorithm used in a process of generating the foregoing tree classifier includes but is not limited to information entropy inspection, Gini index inspection, inspection of extraction of root, and gain rate inspection; the attribute selection may include selection of a single random attribute and selection of multiple random attributes, and the attribute selection policy is not limited in this embodiment of the present invention; and the tree pruning policy includes but is not limited to a pre-pruning policy and a post-pruning policy.

202c. Repeat the foregoing steps 202a and 202b to generate N tree classifiers, and combine the N tree classifiers to generate the classifier set.

The number N of generated tree classifiers in this embodiment of the present invention may be a preset threshold, that is, when the number of generated tree classifiers reaches the preset threshold, the generated N tree classifiers may be combined to generate the classifier set. For example, when the preset threshold N is 5, the classifier set C={$C_1,C_2,C_3,C_4,C_5$}. The time when the classifier set is generated may also be determined by calculating a difference between an error rate of generated K tree classifiers and an error rate of generated K−1 tree classifiers. Specifically, when a $(K-1)^{th}$ tree classifier is generated, the error rate of the generated K−1 tree classifiers may be calculated, and when a $K^{th}$ tree classifier is generated, the error rate of the generated K tree classifiers may be calculated. In this way, when the calculated difference between the error rate of the K tree classifiers and the error rate of the K−1 tree classifiers is less than a preset threshold, the generated K tree classifiers are combined to generate the classifier set, where K is an integer less than or equal to N.

When the $K^{th}$ tree classifier is generated, a method for calculating the error rate of the generated K tree classifiers is as follows: calculate a prediction label for each training unit in the training set, and obtain the error rate of the generated K tree classifiers according to the prediction label. Specifically, a first type tree classifier is selected from the classifier set according to a first training unit, and a first prediction label of the first training unit is generated according to the first type tree classifier; a second type tree classifier is selected from the classifier set according to a second training unit, and a second prediction label of the second training unit is generated according to the second type tree classifier; . . . an $M^{th}$ type tree classifier is selected from the classifier set according to an $M^{th}$ training unit, and an $M^{th}$ prediction label of the $M^{th}$ training unit is generated according to the $M^{th}$ type tree classifier; and the foregoing steps are repeated until a prediction label corresponding to each training unit in the training set is correspondingly calculated, and finally the error rate of the generated K tree classifiers is obtained according to the calculated M prediction labels, where the $M^{th}$ type tree classifier is a classifier set that does not use the $M^{th}$ training unit to generate a tree classifier.

A specific process of calculating a prediction label is as follows: it is assumed that for an $r^{th}$ training unit in the training set (where r is a positive integer greater than 0 but less than or equal to M), tree classifiers in the classifier set may be classified into two types: one type is a tree classifier generated by using the $r^{th}$ training unit, and the other type is a tree classifier generated without using the $r^{th}$ training unit. The tree classifiers that are generated without using the $r^{th}$ training unit are combined into one set and the set is called an $r^{th}$ type tree classifier, which is denoted as $C_r^{OOB}$. A specific formula for calculating an $r^{th}$ prediction label of the $r^{th}$ training unit is as follows:

$$C^{OOB}(r, x_r) = \underset{y}{\mathrm{argmax}} \sum_{C_j \in C_r^{OOB}} h(\varepsilon_j) I(C_j(x_r) = y)$$

where, $C^{OOB}(r, x_r)$ is the $r^{th}$ prediction label of the $r^{th}$ training unit, $C_j$ is a $j^{th}$ tree classifier, $C_r^{OOB}$ is the $r^{th}$ type tree classifier, $h(\varepsilon_j)$ is a weight of the $j^{th}$ tree classifier, $C_j(x_r)$ is a target attribute that is obtained according to the $j^{th}$ tree classifier and a training attribute set included in the $r^{th}$ training unit, y is a classification label, y∈Y, Y is a classification label set obtained according to the $r^{th}$ training unit and the classifier set, and I(x) is an indicator function: I(true)=1, I(false)=0.

A specific formula for calculating the error rate of the generated K tree classifiers is as follows:

$$E(T) = \frac{1}{M} \sum_{r=1}^{M} I(C^{OOB}(r, x_r) = y_r)$$

where, E(T) is the error rate of the generated K tree classifiers, M is the number of training units in the training set, $C^{OOB}(r, x_r)$ is the $r^{th}$ prediction label of the $r^{th}$ training unit, $y_r$ is a target attribute of the $r^{th}$ training unit, and I(x) is an indicator function: I(true)=1, I(false)=0.

A specific process of calculating the weight of the $j^{th}$ tree classifier is as follows: A $j'^{th}$ training subset is selected from the training set, a false prediction rate of the $j^{th}$ tree classifier is acquired according to the $j'^{th}$ training subset, and finally the weight of the $j^{th}$ tree classifier is acquired according to the false prediction rate of the $j^{th}$ tree classifier, where an intersection set of the $j^{th}$ training subset and the $j^{th}$ training subset is empty, and the $j'^{th}$ training subset includes at least one training unit. Specifically, the $j'^{th}$ training subset is recorded as T''={$(x^*_r, y^*_r)$, r=1, 2, . . . N}, where T''∩T'=ϕ, T' is the $j^{th}$ training subset for generating the $j^{th}$ tree classifier. A specific formula for calculating the false prediction rate of the $j^{th}$ tree classifier is as follows:

$$\varepsilon_j = \frac{1}{N} \sum_{r=1}^{N} I(C_j(x^*_r) \neq y^*_r)$$

where, $\varepsilon_j$ is the false prediction rate of the $j^{th}$ tree classifier, N is the number of training units in the $N'^{th}$ training subset, I(x) is an indicator function: I(true)=1, I(false)=0, $C_j(x^*_r)$ is a target attribute that is obtained according to the $j^{th}$ tree classifier and the training attribute set included in the $r^{th}$ training unit, and $y^*_r$ is the target attribute included in the $r^{th}$ training unit.

The weight of the $j^{th}$ tree classifier is obtained by using the formula $h(\varepsilon_j)$, where h(x)=1−x or $$h(x) = \log\left(\frac{1}{x}\right).$$

203. Collect statistics about attribute information of a faulty product.

When a defect of the faulty product needs to be predicted, statistics about attribute information of the faulty product may be collected first. The attribute information is data that is of the faulty product and obtained in a production and use process, and may include: a product name, a product model, a component part, a life cycle, a use place, a production date, a processing department, and the like.

204. Predict a defect of a faulty product by using the classifier set as a prediction model and according to the attribute information, so as to obtain a classification label set.

After the attribute information of the faulty product is obtained by statistics collecting, the defect of the faulty product may be predicted by using the attribute information, which is obtained by statistics collecting, of the faulty product, and by using the pre-trained classifier set as a prediction model. Because the generated classifier set includes N tree classifiers, multiple prediction results occur for the defect that is of the faulty product and predicted by using the classifier set. The multiple predicted results are used as the classification label set. By using the defect prediction method provided in this embodiment of the present invention, not only the defect of the faulty product can be predicted, but also multiple prediction results can be obtained as a reference for the maintenance person. When the maintenance person detects the faulty product according to the first prediction result obtained by prediction and finds that the first prediction result is not the defect of the faulty product, the maintenance person may select another prediction result from the classification label set to detect the faulty product until a real defect of the faulty product is found. In this way, time can be saved for the maintenance person.

205. Acquire a trust value of each classification label in the classification label set according to the classifier set and a weight of the tree classifier in the classifier set.

After the classification label set is obtained according to the attribute information, which is obtained by statistics collecting, of the faulty product, the trust value of each classification label in the classification label set may be further calculated according to the classifier set and the weight of the tree classifier in the classifier set, so that the maintenance person can locate the defect of the faulty product more quickly. A specific method for calculating the trust value of the classification label is as follows:

$$U_r(y) = \frac{1}{Z} \sum_{j=1}^{|C|} h(\varepsilon_j) I(C_j(x_r) = y)$$

where, Y is the classification label set, and $y \in Y$; $U_r(y)$ is a trust value of a classification label y; Z is a normalizing factor, and $$Z = \sum_{j=1}^{|C|} h(\varepsilon_j); h(\varepsilon_j)$$

is the weight of the $j^{th}$ tree classifier; I(x) is an indicator function: I(true)=1, I(false)=0; $C_j(x_r)$ is a target attribute that is of the faulty product and predicted according to the $j^{th}$ tree classifier.

If $U_r(y)=0$ is calculated by using the formula, it indicates that the attribute information is not used for classification of y. In addition, a possible defect classification label of r is defined as $\{y \in Y | U_r(y) > \sigma\}$.

In a defect prediction method provided in this embodiment of the present invention, a training attribute set is selected from a pre-stored product fault record according to a target attribute, and a classifier set that includes at least two tree classifiers is generated according to a training set that is obtained by combining the target attribute and the training attribute set. In this case, when a fault occurs in a product, the classifier set may be used as a prediction model to predict a defect of the faulty product. By using the classifier set as a prediction model, a problem that a defect of a faulty product cannot be predicted due to overfitting or underfitting that is easily caused by using of a single decision tree is solved, and accuracy for predicting the defect of the faulty product is also improved in addition to quick location of the defect of the faulty product.

In addition, when the classifier set is used as a prediction model to predict a defect of the faulty product, multiple prediction results may further be obtained and a trust value of each prediction result may be calculated, thereby saving time for locating a defect by a maintenance person.

Embodiment 3

Figure 3:
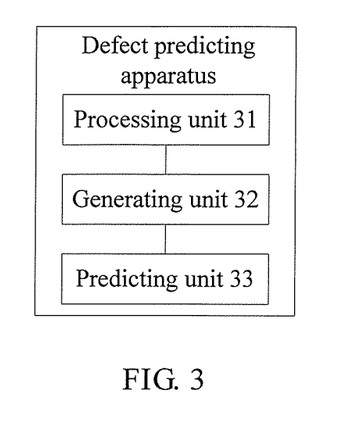
FIG. 3 is a schematic compositional diagram of a defect prediction apparatus according to Embodiment 3 of the present invention.

This embodiment of the present invention provides a defect prediction apparatus. As shown in FIG. 3, the apparatus includes: a processing unit 31, a generating unit 32, and a predicting unit 33.

The processing unit 31 is configured to select a training attribute set from a pre-stored product fault record according to a target attribute, and combine the target attribute and the training attribute set into a training set, where the target attribute is a defect attribute of a historical faulty product.

The generating unit 32 is configured to generate a classifier set according to the training set that is obtained by the processing unit 31, where the classifier set includes at least two tree classifiers.

The predicting unit 33 is configured to predict a defect of a faulty product by using the classifier set, which is generated by the generating unit 32, as a prediction model.

Further, the training set includes M training units, and each training unit includes one target attribute and one training attribute set.

Figure 4:
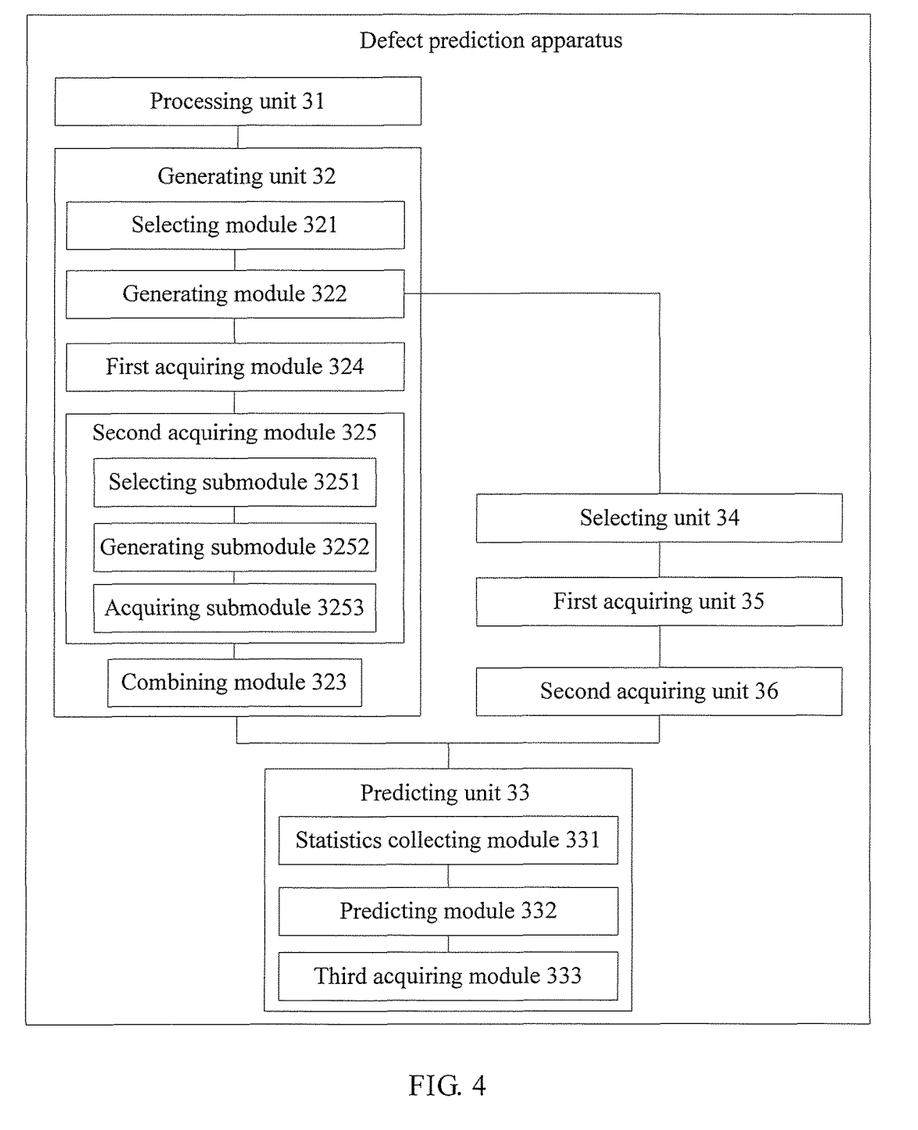
FIG. 4 is a schematic compositional diagram of another defect prediction apparatus according to Embodiment 3 of the present invention.

Further, as shown in FIG. 4, the generating unit 32 may include: a selecting module 321, a generating module 322, and a combining module 323.

The selecting module 321 is configured to select a first training subset from the training set that is obtained by the processing unit 31.

The generating module 322 is configured to generate, according to a preset policy, a first tree classifier corresponding to the first training subset that is selected by the selecting module 321.

The selecting module 321 is further configured to select a second training subset from the training set that is obtained by the processing unit 31.

The generating module 322 is further configured to generate, according to the preset policy, a second tree classifier corresponding to the second training subset that is selected by the selecting module 321.

The selecting module 321 is further configured to select an $N^{th}$ training subset from the training set that is obtained by the processing unit 31, where the $N^{th}$ training subset includes M' training units, and M' is less than or equal to M.

The generating module 322 is further configured to generate, according to the preset policy, an $N^{th}$ tree classifier corresponding to the $N^{th}$ training subset that is selected by the selecting module 321, where N is an integer greater than or equal to 2.

The combining module 323 is configured to combine N tree classifiers generated by the generating module 322 to generate the classifier set.

Further, the generating unit 32 may further include: a first acquiring module 324 and a second acquiring module 325.

The first acquiring module 324 is configured to acquire an error rate of generated K−1 tree classifiers when a $(K-1)^{th}$ tree classifier is generated.

The second acquiring module 325 is configured to acquire an error rate of generated K tree classifiers when a $K^{th}$ tree classifier is generated, so that when a difference between the error rate of the K tree classifiers and the error rate of the K−1 tree classifiers is less than a preset threshold, the K tree classifiers are combined to generate the classifier set, where K is an integer less than or equal to N.

Further, the second acquiring module 325 may include: a selecting submodule 3251, a generating submodule 3252, and an acquiring submodule 3253.

The selecting submodule 3251 is configured to select a first type tree classifier from the classifier set according to a first training unit.

The generating submodule 3252 is configured to generate a first prediction label of the first training unit according to the first type tree classifier that is selected by the selecting submodule 3251.

The selecting submodule 3251 is further configured to select a second type tree classifier from the classifier set according to a second training unit.

The generating submodule 3252 is further configured to generate a second prediction label of the second training unit according to the second type tree classifier that is selected by the selecting submodule 3251.

The selecting submodule 3251 is further configured to select an $M^{th}$ type tree classifier from the classifier set according to an $M^{th}$ training unit, where the $M^{th}$ type tree classifier is a classifier set that does not use the $M^{th}$ training unit to generate a tree classifier, and M is the number of training units included in the training set.

The generating submodule 3252 is further configured to generate an $M^{th}$ prediction label of the $M^{th}$ training unit according to the $M^{th}$ type tree classifier that is selected by the selecting submodule 3251.

The acquiring submodule 3253 is configured to acquire the error rate of the generated K tree classifiers according to M prediction labels that are generated by the generating submodule 3252.

Further, the generating submodule 3252 is specifically configured to: generate the $M^{th}$ prediction label according to $$C^{OOB}(M, x_M) = \underset{y}{\operatorname{argmax}} \sum_{C_j \in C_M^{OOB}} h(\varepsilon_j) I(C_j(x_M) = y),$$

where $C^{OOB}(M, x_M)$ is the $M^{th}$ prediction label of the $M^{th}$ training unit $C_j$ is a $j^{th}$ tree classifier, $C_M^{OOB}$ is the $M^{th}$ type tree classifier, $h(\varepsilon_j)$ is a weight of the $j^{th}$ tree classifier, $C_j(x_M)$ is a target attribute that is obtained according to the $j^{th}$ tree classifier and a training attribute set included in the $M^{th}$ training unit, $y \in Y$, and Y is a classification label set.

Further, the acquiring submodule 3253 is specifically configured to: acquire, according to $$E(T) = \frac{1}{M} \sum_{r=1}^{M} I(C^{OOB}(r, x_r) = y_r),$$

the error rate of the K tree classifiers generated by the generating submodule 3252, where E(T) is the error rate of the generated K tree classifiers, M is the number of training units in the training set, $C^{OOB}(r, x_r)$ is an $r^{th}$ prediction label of an $r^{th}$ training unit, and $y_r$ is a target attribute of the $r^{th}$ training unit.

Further, the apparatus may further include: a selecting unit 34, a first acquiring unit 35, and a second acquiring unit 36.

The selecting unit 34 is configured to select an $N'^{th}$ training subset from the training set after the generating module 322 generates, according to the preset policy, an $N^{th}$ tree classifier corresponding to the $N^{th}$ training subset, where an intersection set of the $N^{th}$ training subset and the $N'^{th}$ training subset is empty, and the $N'^{th}$ training subset includes at least one training unit.

The first acquiring unit 35 is configured to acquire a false prediction rate of the $N^{th}$ tree classifier according to the $N'^{th}$ training subset that is selected by the selecting unit 34.

The second acquiring unit 36 is configured to acquire a weight of the $N^{th}$ tree classifier according to the false prediction rate of the $N^{th}$ tree classifier that is acquired by the first acquiring unit 35.

Further, the predicting unit 33 may include: a statistics collecting module 331, a predicting module 332, and a third acquiring module 333.

The statistics collecting module 331 is configured to collect statistics about attribute information of the faulty product.

The predicting module 332 is configured to predict the defect of the faulty product by using the classifier set as a prediction model and according to the attribute information about which the statistics collecting module 331 collects statistics, so as to obtain a classification label set.

The third acquiring module 333 is configured to acquire a trust value of each classification label in the classification label set according to the classifier set and a weight of each tree classifier in the classifier set.

In a defect prediction apparatus provided in this embodiment of the present invention, a training attribute set is selected from a pre-stored product fault record according to a target attribute, and a classifier set that includes at least two tree classifiers is generated according to a training set that is obtained by combining the target attribute and the training attribute set. In this case, when a fault occurs in a product, the classifier set may be used as a prediction model to predict a defect of the faulty product. By using the classifier set as a prediction model, a problem that a defect of a faulty product cannot be predicted due to overfitting or underfitting that is easily caused by using of a single decision tree is solved, and accuracy for predicting the defect of the faulty product is also improved in addition to quick location of the defect of the faulty product.

In addition, when the classifier set is used as a prediction model to predict a defect of the faulty product, multiple prediction results can further be obtained and a trust value of each prediction result can be calculated, thereby saving time for locating a defect by a maintenance person.

Embodiment 4

Figure 5:
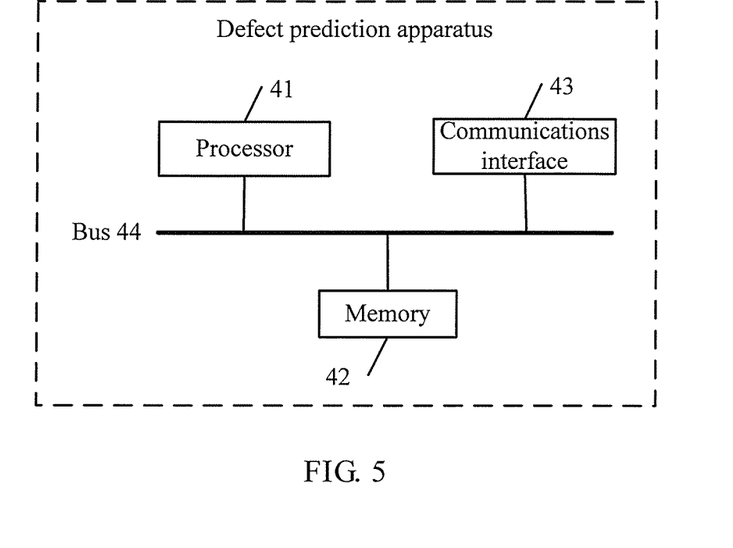
FIG. 5 is a schematic compositional diagram of a defect prediction apparatus according to Embodiment 4 of the present invention.

This embodiment of the present invention provides a defect prediction apparatus. As shown in FIG. 5, the apparatus includes: at least one processor 41, a memory 42, a communications interface 43, and a bus 44. The at least one processor 41, the memory 42, and the communications interface 43 are connected by using the bus 44, and communicate with each other by using the bus 44.

The bus 44 may be an Industry Standard Architecture (Industry Standard Architecture, ISA) bus, a Peripheral Component Interconnect (Peripheral Component Interconnect, PCI) bus, an Extended Industry Standard Architecture (Extended Industry Standard Architecture, EISA) bus, or the like. The bus 44 may be classified into an address bus, a data bus, a control bus, and the like. For ease of denotation, the bus is represented by using only one thick line in FIG. 5; however, it does not indicate that there is only one bus or only one type of bus.

The memory 42 is configured to store executable program code, where the program code includes a computer operation instruction. The memory 42 may include a high-speed RAM memory, and may also include a non-volatile memory (non-volatile memory), such as at least one disk memory.

The processor 41 may be a central processing unit (Central Processing Unit, CPU), or an application-specific integrated circuit (Application Specific Integrated Circuit, ASIC), or be configured as one or more integrated circuits that implement the embodiments of the present invention.

The communications interface 43 is mainly configured to implement communication between devices in this embodiment.

The processor 41 executes the program code and is configured to select a training attribute set from a pre-stored product fault record according to a target attribute, and combine the target attribute and the training attribute set into a training set, where the target attribute is a defect attribute of a historical faulty product; generate a classifier set according to the training set, where the classifier set includes at least two tree classifiers; and predict a defect of the faulty product by using the generated classifier set as a prediction model.

Further, the training set includes M training units, and each training unit includes one target attribute and one training attribute set. The processor 41 is further configured to select a first training subset from the training set, and generate, according to a preset policy, a first tree classifier corresponding to the first training subset; select a second training subset from the training set and generate, according to the preset policy, a second tree classifier corresponding to the second training subset; and select an $N^{th}$ training subset from the training set and generate, according to the preset policy, an $N^{th}$ tree classifier corresponding to the $N^{th}$ training subset; and finally combine generated N tree classifiers to generate the classifier set. The $N^{th}$ training subset includes M' training units, M' is less than or equal to M, and N is an integer greater than or equal to 2.

Further, the processor 41 is further configured to: acquire an error rate of generated K−1 tree classifiers when a $(K-1)^{th}$ tree classifier is generated; and acquire an error rate of generated K tree classifiers when a $K^{th}$ tree classifier is generated, so that when a difference between the error rate of the K tree classifiers and the error rate of the K−1 tree classifiers is less than a preset threshold, the K tree classifiers are combined to generate the classifier set, where K is an integer less than or equal to N.

Further, the processor 41 is further configured to: select a first type tree classifier from the classifier set according to a first training unit, and generate a first prediction label of the first training unit according to the first type tree classifier; select a second type tree classifier from the classifier set according to a second training unit, and generate a second prediction label of the second training unit according to the second type tree classifier; select an $M^{th}$ type tree classifier from the classifier set according to an $M^{th}$ training unit, and generate an $M^{th}$ prediction label of the $M^{th}$ training unit according to the $M^{th}$ type tree classifier; and finally acquire an error rate of the generated K tree classifiers according to generated M prediction labels, where the $M^{th}$ type tree classifier is a classifier set that does not use the $M^{th}$ training unit to generate a tree classifier, and M is the number of training units included in the training set.

Further, the processor 41 is further configured to: generate the $M^{th}$ prediction label according to $$C^{OOB}(M, x_M) = \underset{y}{\mathrm{argmax}} \sum_{C_j \in C_M^{OOB}} h(\varepsilon_j) I(C_j(x_M) = y),$$

where $C^{OOB}(M, x_M)$ is the $M^{th}$ prediction label of the $M^{th}$ training unit, $C_j$ is a $j^{th}$ tree classifier, $C_M^{OOB}$ is the $M^{th}$ type tree classifier, $h(\varepsilon_j)$ is a weight of the $j^{th}$ tree classifier, $C_j(x_M)$ is a target attribute that is obtained according to the $j^{th}$ tree classifier and a training attribute set included in the $M^{th}$ training unit, y∈Y, and Y is a classification label set; and acquire the error rate of the generated K tree classifiers according to $$E(T) = \frac{1}{M} \sum_{r=1}^{M} I(C^{OOB}(r, x_r) = y_r),$$

where E(T) is the error rate of the generated K tree classifiers, M is the number of training units in the training set, $C^{OOB}(r, x_r)$ is an $r^{th}$ prediction label of an $r^{th}$ training unit, and $y_r$ is a target attribute of the $r^{th}$ training unit.

Further, the processor 41 is further configured to: after the generating, according to the preset policy, an $N^{th}$ tree classifier corresponding to the $N^{th}$ training subset, select an $N'^{th}$ training subset from the training set, acquire a false prediction rate of the $N^{th}$ tree classifier according to the $N'^{th}$ training subset, and acquire a weight of the $N^{th}$ tree classifier according to the false prediction rate of the $N^{th}$ tree classifier, where an intersection set of the $N^{th}$ training subset and the $N'^{th}$ training subset is empty, and the $N'^{th}$ training subset includes at least one training unit.

Further, the processor 41 is further configured to: collect statistics about attribute information of the faulty product; predict the defect of the faulty product by using the classifier set as a prediction model and according to the attribute information, so as to obtain a classification label set; and acquire a trust value of each classification label in the classification label set according to the classifier set and a weight of the tree classifier in the classifier set.

Further, the preset policy includes a decision tree algorithm.

In a defect prediction apparatus provided in this embodiment of the present invention, a training attribute set is selected from a pre-stored product fault record according to a target attribute, and a classifier set that includes at least two tree classifiers is generated according to a training set that is obtained by combining the target attribute and the training attribute set. In this case, when a fault occurs in a product, the classifier set may be used as a prediction model to predict a defect of the faulty product. By using the classifier set as a prediction model, a problem that a defect of a faulty product cannot be predicted due to overfitting or underfitting that is easily caused by using of a single decision tree is solved, and accuracy for predicting the defect of the faulty product is also improved in addition to quick location of the defect of the faulty product.

In addition, when the classifier set is used as a prediction model to predict a defect of the faulty product, multiple prediction results can further be obtained and a trust value of each prediction result can be calculated, thereby saving time for locating a defect by a maintenance person.

According to the foregoing description of the implementation manners, a person skilled in the art may clearly understand that the present invention may be implemented by using software together with necessary universal hardware, and certainly, may also be implemented by using hardware, but in many cases the former is a better implementation manner. Based on such an understanding, the technical solutions of the present invention essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A defect prediction method, comprising:
    selecting, by a processing device, a training attribute set from a pre-stored product fault record according to a target attribute, and combining the target attribute and the training attribute set into a training set, wherein the target attribute is a defect attribute of a historical faulty product;
    generating, by the processing device, a classifier set according to the training set, wherein the classifier set comprises at least two tree classifiers;
    predicting, by the processing device, a defect of a faulty product by using the classifier set as a prediction model;
    acquiring, by the processing device, an error rate of generated K−1 tree classifiers when a (K−1)$^{th}$ tree classifier is generated;
    acquiring, by the processing device, an error rate of generated K tree classifiers when a K$^{th}$ tree classifier is generated, so that when a difference between the error rate of the K tree classifiers and the error rate of the K−1 tree classifiers is less than a preset threshold, the K tree classifiers are combined to generate the classifier set, wherein K is an integer less than or equal to N, wherein N is an integer greater than or equal to 2;
    generating, by the processing device, a prediction result in accordance with the predicted defect; and
    notifying a user of the prediction result.

2. The defect prediction method according to claim 1, wherein:
    the training set comprises M training units, wherein M is an integer greater than or equal to 1, and each training unit comprises one target attribute and one training attribute set; and
    generating a classifier set according to the training set comprises:
        selecting a first training subset from the training set,
        generating, according to a preset policy, a first tree classifier corresponding to the first training subset,
        selecting a second training subset from the training set,
        generating, according to the preset policy, a second tree classifier corresponding to the second training subset,
        selecting an N$^{th}$ training subset from the training set, wherein the N$^{th}$ training subset comprises M' training units, and M' is less than or equal to M,
        generating, according to the preset policy, an N$^{th}$ tree classifier corresponding to the N$^{th}$ training subset, wherein N is an integer greater than or equal to 2, and
        combining N tree classifiers to generate the classifier set.

3. The defect prediction method according to claim 1, wherein acquiring an error rate of generated K tree classifiers when a K$^{th}$ tree classifier is generated comprises:
    selecting a first type tree classifier from the classifier set according to a first training unit;
    generating a first prediction label of the first training unit according to the first type tree classifier;
    selecting a second type tree classifier from the classifier set according to a second training unit;
    generating a second prediction label of the second training unit according to the second type tree classifier;
    selecting an M$^{th}$ type tree classifier from the classifier set according to an M$^{th}$ training unit, wherein the M$^{th}$ type tree classifier is a classifier set that does not use the M$^{th}$ training unit to generate a tree classifier, and M is the number of training units comprised in the training set;
    generating an M$^{th}$ prediction label of the M$^{th}$ training unit according to the M$^{th}$ type tree classifier; and
    acquiring the error rate of the generated K tree classifiers according to M prediction labels.

4. The defect prediction method according to claim 3, wherein generating an M$^{th}$ prediction label of the M$^{th}$ training unit according to the M$^{th}$ type tree classifier comprises:
    generating the M$^{th}$ prediction label according to $$C^{OOB}(M, x_M) = \underset{y}{\operatorname{argmax}} \sum_{C_j \in C_M^{OOB}} h(\varepsilon_j) I(C_j(x_M) = y),$$

wherein $C^{OOB}(M, x_M)$ is the M$^{th}$ prediction label of the M$^{th}$ training unit, $C_j$ is a j$^{th}$ tree classifier, $C_M^{OOB}$ is the M$^{th}$ type tree classifier, $h(\varepsilon_j)$ is a weight of the j$^{th}$ tree classifier, $C_j(x_M)$ is a target attribute that is obtained according to the j$^{th}$ tree classifier and a training attribute set comprised in the M$^{th}$ training unit, y∈Y, and Y is a classification label set.

5. The defect prediction method according to claim 4, wherein acquiring the error rate of the generated K tree classifiers according to M prediction labels comprises:
    acquiring the error rate of the generated K tree classifiers according to $$E(T) = \frac{1}{M} \sum_{r=1}^{M} I(C^{OOB}(r, x_r) = y_r),$$

wherein E(T) is the error rate of the generated K tree classifiers, M is the number of training units in the training set, $C^{OOB}(r, x_r)$ is an r$^{th}$ prediction label of an r$^{th}$ training unit, and $y_r$ is a target attribute of the r$^{th}$ training unit.

6. A defect prediction method, comprising:
    selecting, by a processing device, a training attribute set from a pre-stored product fault record according to a target attribute, and combining the target attribute and the training attribute set into a training set, wherein the target attribute is a defect attribute of a historical faulty product;

generating, by the processing device, a classifier set according to the training set, wherein the classifier set comprises at least two tree classifiers;

predicting, by the processing device, a defect of a faulty product by using the classifier set as a prediction model;

wherein the training set comprises M training units, wherein M is an integer greater than or equal to 1, and each training unit comprises one target attribute and one training attribute set;

wherein generating a classifier set according to the training set comprises:
  selecting a first training subset from the training set,
  generating, according to a preset policy, a first tree classifier corresponding to the first training subset,
  selecting a second training subset from the training set,
  generating, according to the preset policy, a second tree classifier corresponding to the second training subset,
  selecting an $N^{th}$ training subset from the training set, wherein the $N^{th}$ training subset comprises M' training units, and M' is less than or equal to M,
  generating, according to the preset policy, an $N^{th}$ tree classifier corresponding to the $N^{th}$ training subset, wherein N is an integer greater than or equal to 2, and
  combining N tree classifiers to generate the classifier set;

wherein after generating, according to the preset policy, an $N^{th}$ tree classifier corresponding to the $N^{th}$ training subset, the method further comprises:
  selecting an $N'^{th}$ training subset from the training set, wherein an intersection set of the $N'^{th}$ training subset and the $N^{th}$ training subset is empty, and the $N'^{th}$ training subset comprises at least one training unit,
  acquiring a false prediction rate of the $N^{th}$ tree classifier according to the $N'^{th}$ training subset, and
  acquiring a weight of the $N^{th}$ tree classifier according to the false prediction rate of the $N^{th}$ tree classifier;

generating, by the processing device, a prediction result in accordance with the predicted defect; and
notifying a user of the prediction result.

7. The defect prediction method according to claim 6 wherein predicting a defect of a faulty product by using the classifier set as a prediction model comprises:
  collecting statistics about attribute information of the faulty product;
  predicting the defect of the faulty product by using the classifier set as a prediction model and according to the attribute information, so as to obtain a classification label set; and
  acquiring a trust value of each classification label in the classification label set according to the classifier set and a weight of each tree classifier in the classifier set.

8. The defect prediction method according to claim 2, wherein the preset policy comprises a decision tree algorithm.

9. A defect prediction apparatus, comprising:
a processor;
memory coupled to the processor, the memory comprising instructions that, when executed by the processor, cause the defect prediction apparatus to:
  select a training attribute set from a pre-stored product fault record according to a target attribute, and combine the target attribute and the training attribute set into a training set, wherein the target attribute is a defect attribute of a historical faulty product,
  generate a classifier set according to the training set, wherein the classifier set comprises at least two tree classifiers,
  predict a defect of a faulty product by using the classifier set as a prediction model,
  acquire an error rate of generated K−1 tree classifiers when a $(K-1)^{th}$ tree classifier is generated,
  acquire an error rate of generated K tree classifiers when a $K^{th}$ tree classifier is generated, so that when a difference between the error rate of the K tree classifiers and the error rate of the K−1 tree classifiers is less than a preset threshold, the K tree classifiers are combined to generate the classifier set, wherein K is an integer less than or equal to N, wherein N is an integer greater than or equal to 2;
  generate a prediction result in accordance with the predicted defect; and
  notify a user of the prediction result.

10. The defect prediction apparatus according to claim 9, wherein:
the training set comprises M training units, wherein M is an integer greater than or equal to 1, and each training unit comprises one target attribute and one training attribute set; and
the memory further comprises instructions that, when executed by the processor, cause the defect prediction apparatus to:
  select a first training subset from the training set,
  generate, according to a preset policy, a first tree classifier corresponding to the selected first training subset,
  select a second training subset from the training set,
  generate, according to the preset policy, a second tree classifier corresponding to the selected second training subset,
  select an $N^{th}$ training subset from the training set, wherein the $N^{th}$ training subset comprises M' training units, and M' is less than or equal to M, and
  generate, according to the preset policy, an $N^{th}$ tree classifier corresponding to the selected $N^{th}$ training subset, wherein N is an integer greater than or equal to 2, and
  combine N tree classifiers to generate the classifier set.

11. The defect prediction apparatus according to claim 10, wherein the memory further comprises instructions that, when executed by the processor, cause the defect prediction apparatus to:
  select a first type tree classifier from the classifier set according to a first training unit;
  generate a first prediction label of the first training unit according to the selected first type tree classifier,
  select a second type tree classifier from the classifier set according to a second training unit,
  generate a second prediction label of the second training unit according to the selected second type tree classifier,
  select an $M^{th}$ type tree classifier from the classifier set according to an $M^{th}$ training unit, wherein the $M^{th}$ type tree classifier is a classifier set that does not use the $M^{th}$ training unit to generate a tree classifier, and M is the number of training units comprised in the training set, and
  generate an $M^{th}$ prediction label of the $M^{th}$ training unit according to the selected $M^{th}$ type tree classifier; and acquire the error rate of the generated K tree classifiers according to M prediction labels that are generated by the generating submodule.

12. The defect prediction apparatus according to claim 11, wherein the memory further comprises instructions that, when executed by the processor, cause the defect prediction apparatus to:
generate the $M^{th}$ prediction label according to $$C^{OOB}(M, x_M) = \underset{y}{\mathrm{argmax}} \sum_{C_j \in C_M^{OOB}} h(\varepsilon_j) I(C_j(x_M) = y),$$

wherein $C^{OOB}(M, x_M)$ is the $M^{th}$ prediction label of the $M^{th}$ training unit, $C_j$ is a $j^{th}$ tree classifier, $C_M^{OOB}$ is the $M^{th}$ type tree classifier, $h(\varepsilon_j)$ is a weight of the $j^{th}$ tree classifier, $C_j(x_M)$ is a target attribute that is obtained according to the $j^{th}$ tree classifier and a training attribute set comprised in the $M^{th}$ training unit, y∈Y, and Y is a classification label set.

13. The defect prediction apparatus according to claim 12, wherein the memory further comprises instructions that, when executed by the processor, cause the defect prediction apparatus to:
acquire, according to $$E(T) = \frac{1}{M} \sum_{r=1}^{M} I(C^{OOB}(r, x_r) = y_r),$$

the error rate of the generated K tree classifiers, wherein E(T) is the error rate of the generated K tree classifiers, M is the number of training units in the training set, $C^{OOB}(r, x_r)$ is an $r^{th}$ prediction label of an $r^{th}$ training unit, and $y_r$ is a target attribute of the $r^{th}$ training unit.

14. A defect prediction apparatus, comprising:
a processor;
memory coupled to the processor, the memory comprising instructions that, when executed by the processor, cause the defect prediction apparatus to:
select a training attribute set from a pre-stored product fault record according to a target attribute, and combine the target attribute and the training attribute set into a training set, wherein the target attribute is a defect attribute of a historical faulty product,
generate a classifier set according to the training set, wherein the classifier set comprises at least two tree classifiers, and
predict a defect of a faulty product by using the classifier set as a prediction model;
wherein the training set comprises M training units, wherein M is an integer greater than or equal to 1, and each training unit comprises one target attribute and one training attribute set; and
the memory further comprises instructions that, when executed by the processor, cause the defect prediction apparatus to:
select a first training subset from the training set,
generate, according to a preset policy, a first tree classifier corresponding to the selected first training subset,
select a second training subset from the training set,
generate, according to the preset policy, a second tree classifier corresponding to the selected second training subset,
select an $N^{th}$ training subset from the training set, wherein the $N^{th}$ training subset comprises M' training units, and M' is less than or equal to M,
generate, according to the preset policy, an $N^{th}$ tree classifier corresponding to the selected $N^{th}$ training subset, wherein N is an integer greater than or equal to 2,
combine N tree classifiers to generate the classifier set,
select an $N'^{th}$ training subset from the training set after generation of an $N^{th}$ tree classifier corresponding to the $N^{th}$ training subset, wherein an intersection set of the $N'^{th}$ training subset and the $N^{th}$ training subset is empty, and the $N'^{th}$ training subset comprises at least one training unit,
acquire a false prediction rate of the $N^{th}$ tree classifier according to the $N'^{th}$ training subset, and
acquire a weight of the $N^{th}$ tree classifier according to the acquired false prediction rate of the $N^{th}$ tree classifier;
generate a prediction result in accordance with the predicted defect; and
notify a user of the prediction result.

15. The defect prediction apparatus according to claim 14, wherein the memory further comprises instructions that, when executed by the processor, cause the defect prediction apparatus to:
collect statistics about attribute information of the faulty product;
predict the defect of the faulty product by using the classifier set as a prediction model and according to the attribute information, so as to obtain a classification label set; and
acquire a trust value of each classification label in the classification label set according to the classifier set and a weight of each tree classifier in the classifier set.

16. The defect prediction apparatus according to claim 10, wherein the preset policy comprises a decision tree algorithm.

* * * * *